Sept. 15, 1953 R. H. MERRICK 2,652,228
BEARING CONSTRUCTION
Filed Jan. 11, 1950
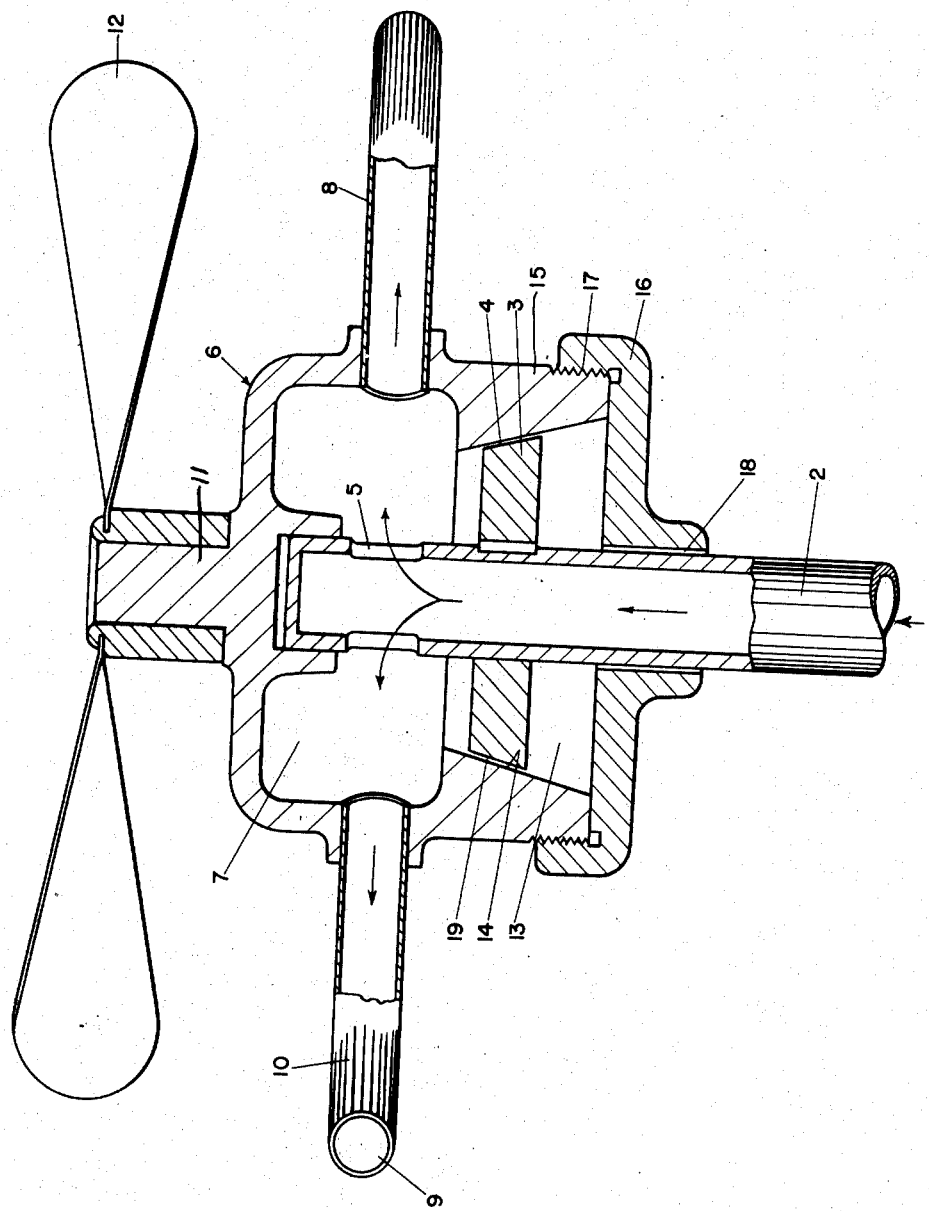
INVENTOR.
Richard H. Merrick
BY
atty.

Patented Sept. 15, 1953

2,652,228

UNITED STATES PATENT OFFICE 2,652,228

BEARING CONSTRUCTION

Richard H. Merrick, Syracuse, N. Y., assignor to Carrier Corporation, Syracuse, N. Y., a corporation of Delaware Application January 11, 1950, Serial No. 137,981

7 Claims. (Cl. 253—175)

This invention relates to a bearing for rotating mechanism and more particularly to a bearing construction for a hydraulic turbine.

The chief object of the present invention is to provide an improved bearing structure for a rotor in which the effect of the weight of the rotor pushing against the bearing surfaces is greatly reduced.

An object of the present invention is to provide a simple and economical bearing device for use with a hydraulic turbine which equalizes thrust forces.

A further object is to provide a bearing construction in which a flow of liquid is obtained between contact surfaces to reduce friction created by mechanical contact of metal to metal irregularities. Other objects of my invention will be readily perceived from the following description.

This invention relates to a bearing for rotating mechanism comprising, in combination, a hollow stationary shaft through which liquid is passed under pressure, a member surrounding the shaft adapted to rotate thereabout and to move axially thereof, a chamber in said member, said shaft having an opening therein connecting the chamber with the interior of the shaft, means on said shaft forming a support for said member, a second chamber in said member, pressure of liquid in the first chamber automatically moving said member away from its support and filling the second chamber with liquid whereby during operation said member rotates on a film of liquid.

The attached drawing is a sectional view of a preferred embodiment of the bearing structure of my invention.

Referring to the attached drawing, there is shown the bearing structure of my invention, which structure includes a stationary hollow pipe or shaft 2 connected to a suitable source of supply of liquid under pressure (not shown). Pipe 2 carries a disk 3 having a bevelled surface 4 for a purpose hereinafter explained. A plurality of openings 5 are provided in pipe 2 extending through the wall of the pipe.

A rotor 6 surrounds pipe 2; a chamber 7 connected to the interior of pipe 2 through openings 5 is connected to a plurality of curved hollow arms 8 terminating in nozzles 9. Water under pressure from chamber 7 flows through arms 8 and is discharged through nozzles 9 which are positioned by the curved portion 10 of arms 8 so that the reactive forces caused by the discharge of the liquid through nozzles 9 develop a torque which rotates rotor 6; rotor 6 terminates in a shaft-like portion 11 on which is mounted a member 12 to be rotated, for example, a fan.

A second chamber 13 is provided in rotor 6. The interior wall of chamber 13 preferably is bevelled as shown at 14 so that when rotor 6 is at rest surface 14 rests on and contacts bevelled surface 4 of disk 3.

Preferably rotor 6 is formed in two sections 15 and 16 to simplify manufacture, the two sections 15 and 16 being connected by threads 17. Section 16 is provided with an outlet 18 for a purpose hereinafter explained. When rotor 6 is raised an annular passageway 19 is provided about disk 3 connecting chambers 7 and 13.

Considering the operation of the bearing construction, when rotor 6 is at rest its bevelled surface 14 is in contact with bevelled surface 4 of disk 3. When liquid is introduced into chamber 7 from pipe 2 through openings 5 at a predetermined pressure, there is a net upward force capable of lifting rotor 6 upward from the bevelled surface 4 of disk 3. This upward force raises rotor 6 from the bevelled surface 4 of disk 3 thereby forming a constricted annular passageway around disk 3. Liquid will pass through this variable area passageway to chamber 13 and on through the fixed area of outlet 18 to some lower outside pressure (zero gauge pressure). The variable area passageway automatically adjusts itself to a size that will cause pressure in chamber 13, heretofore, zero gauge pressure, to develop in a measure such that the difference in pressure forces in chambers 13 and 7 exerted on rotor 6 are substantially equal to the downward thrust forces consisting chiefly of the weight of rotor 6 and fan 12, so that the net thrust forces acting on rotor 6 are substantially zero. As the rotor is raised from disk 3, discharge of the liquid through arms 8 and nozzles 9 rotates rotor 6 thereby rotating member 12 and distributing water through the nozzles 9. When the rotor is in motion, it will be separated from the stationary surface of disk 3 by liquid flowing from chamber 7 to chamber 13 and then through the outlet 18, further reducing the friction caused from mechanical contact of metal to metal irregularities.

Since pressure in chamber 7, when the device is in operation, is greater than pressure outside of rotor 6, fluid will flow through any passageway between chamber 7 and the outside zero gauge pressure areas. As rotor 6 rises from disk 3, a passage is formed consisting of a variable area annular passageway 19 between surfaces 4 and 14, chamber 13 and outlet 18. As fluid flows from chamber 7 through this passage to the outside zero gauge pressure area, the accompanying pressure drop is made up chiefly of the sum of the pressure drops through the variable and fixed area annular passages 18 and 19. The passage with the smaller area has the greater pressure drop. The area of the variable area passage 19 is adjustable over a range from completely closed to several times greater than the fixed area passage 18 by the up-and-down motion of rotor 6 relative to disk 3. As a result, pressure in chamber 13 may range from zero pressure gauge to a pressure slightly less than the pressure in chamber 7 as the variable area passage 19 between surfaces 4 and 14 is enlarged from zero to several times the area of passage 18.

It will be understood that surfaces 14 and 4 forming the constricted annular fluid passageway 19 may be bevelled at an angle of approximately 45° from a horizontal line drawn through the base of the disk to prevent jamming of disk 3. It will be understood, of course, that such surfaces may be constructed in other ways if desired to form the constricted annular fluid passageway 19.

In the present invention the effect of the weight of the rotor pressing against the bearing surfaces is greatly reduced over conventional thrust bearing designs. The flow of water between the contact surfaces is maintained to reduce friction created by mechanical contact of metal to metal irregularities. An economical bearing structure is provided which substantially eliminates or greatly reduces friction.

While I have described a preferred embodiment of my invention it will be understood my invention is not limited thereto since it may be otherwise embodied within the scope of the following claims:

I claim:

1. In a bearing for rotating mechanism, the combination of a hollow stationary shaft through which liquid is passed under pressure; a rotor surrounding the shaft adapted to rotate thereabout and to move axially thereof, a chamber in said rotor, said shaft having an opening therein connecting the chamber and the interior of the shaft; means on said shaft adapted to form a support for said rotor; said means having a wall in axial engagement with the inner wall of the rotor to limit axial movement of the rotor, a second chamber in said rotor separated from the first chamber by said support means, said second chamber having an inlet connecting it to the first chamber when the device is in operation, the inlet being formed between the wall of the support means and the inner wall of the rotor upon upward movement of the rotor when the device is in operation, the area of the inlet varying in accordance with the difference in pressure between the first and second chambers; said second chamber having an outlet of fixed area whereby a predetermined pressure difference is maintained between the first and second chambers.

2. In a thrust bearing construction, the combination of a hollow stationary shaft through which liquid is passed under pressure; a rotor surrounding the shaft adapted to rotate thereabout and to move axially thereof, a curved hollow arm extending from said rotor terminating in a nozzle; a chamber in the rotor connected to the opening through the arm and to the interior of the shaft; means on said shaft adapted to form a support for the rotor, said means having a wall in axial engagement with the inner wall of the rotor to limit axial movement of the rotor, a second chamber in the rotor separated from the first chamber by said support means, said second chamber having an inlet connecting it to the first chamber when the device is in operation, the inlet being formed between the wall of the support means and the inner wall of the rotor upon upward movement of the rotor when the device is in operation, the area of the inlet varying in accordance with the difference in pressure between the first and second chambers, said second chamber having an outlet of fixed area to permit the escape of liquid from the second chamber whereby flow of liquid between the first and second chambers is maintained during operation to reduce friction by separating the rotor and said support means, by the thickness of the flowing liquid putting them completely out of mechanical contact.

3. A thrust bearing construction according to claim 2 in which the rotor is provided with a shaft-like portion adapted to receive a member to be rotated.

4. In a thrust bearing construction, the combination of a hollow stationary shaft through which liquid is passed under pressure; a rotor surrounding the shaft adapted to rotate thereabout and to move axially thereof, a chamber in said rotor, said shaft having an opening therein connecting the chamber and the interior of the shaft; means on said shaft adapted to form a support for said rotor; said means having a wall in axial engagement with the inner wall of the rotor to limit axial movement of the rotor, a second chamber in said rotor separated from the first chamber by said support means, said second chamber having an inlet connecting it to the first chamber when the device is in operation, the inlet being formed between the wall of the support means and the inner wall of the rotor upon upward movement of the rotor when the device is in operation, the area of the inlet being automatically adjusted by the pressures existing in said first chamber and the second chamber, the second chamber having an outlet of fixed area to maintain predetermined pressure in the first and second chambers, and means for rotating the rotor.

5. A thrust bearing construction according to claim 4 in which the rotor is provided with a shaft-like portion adapted to receive a member to be rotated.

6. In a thrust bearing construction, the combination of a hollow stationary shaft connected to a source of supply of liquid under pressure; a rotor surrounding the shaft adapted to rotate thereabout and to move axially thereof; hollow curved arms extending from said rotor terminating in nozzles; a chamber in the rotor, said shaft having openings therein connecting the interior of the shaft with the chamber; a disk-like member mounted on said shaft to support the rotor when the device is at rest, said disk-like member serving to separate the chamber into a first portion and a second portion; pressure of liquid in the first portion automatically raising the rotor away from the disk member and opening a constricted passageway between the wall of the disk-like member and the inner wall of the rotor from the first portion to the second portion; said passageway being automatically adjustable in accordance with the pressure existing in said chamber portions, said second portion having an outlet of fixed area whereby flow of liquid is maintained between the first and second portions when the device is in operation to reduce friction.

7. In a bearing for rotating mechanism, the combination of a hollow stationary shaft through which liquid is passed under pressure, a member surrounding the shaft adapted to rotate thereabout and to move axially thereof, a chamber in said member, said member including a recess slidably and rotatably receiving one end of said shaft, said one end of said shaft being closed, said shaft having at least one opening in its periphery adjacent said closed end connecting the chamber and the interior of the shaft, means surrounding and mounted on said shaft forming a support for said member, said means having a wall in axial engagement with the inner wall of the member to limit axial movement of the member, a second chamber in said member separated from the first chamber by said support means, pressure of liquid in the first chamber automatically moving said member away from its support and filling the second chamber with liquid, and maintaining a film of liquid between said support means and said inner wall of said member during operation.

RICHARD H. MERRICK.

References Cited in the file of this patent

UNITED STATES PATENTS

| Number | Name | Date |
|---|---|---|
| 136,799 | White | Mar. 11, 1873 |
| 174,671 | Guerrant | Mar. 4, 1876 |
| 200,676 | Walsh | Feb. 26, 1878 |
| 457,099 | Woolsey | Aug. 4, 1891 |
| 463,792 | Galbraith | Nov. 24, 1891 |
| 465,207 | Russell | Dec. 15, 1891 |
| 601,065 | Smith | Mar. 22, 1898 |
| 666,023 | Perry | Jan. 15, 1901 |
| 1,093,177 | Gaeth | Apr. 14, 1914 |
| 1,239,230 | Shaw | Sept. 4, 1917 |

FOREIGN PATENTS

| Number | Country | Date |
|---|---|---|
| 19,986 | Great Britain | of 1910 |